(No Model.)　　　　　　L. MAYBAUM.　　　　2 Sheets—Sheet 1.
MEANS FOR SECURING AGAINST EXCESSIVE LOSSES BY BAD DEBTS.
No. 465,485.　　　　　　　　　　Patented Dec. 22, 1891.

Fig. 1.

| Guarantees | | Percentage on Sales beyond which Assurve is given | Percentage on Rating which individual indebts must not ex. | Ratings Covered | | Consideration | Conditions |
|---|---|---|---|---|---|---|---|
| Name of Assurer | Name of Assured | | | Capital Rating | Credit Rating | | |

(No Model.)

2 Sheets—Sheet 2.

L. MAYBAUM.
MEANS FOR SECURING AGAINST EXCESSIVE LOSSES BY BAD DEBTS.

No. 465,485.

Patented Dec. 22, 1891.

Fig. 2

| Guarantees. | | | | Ratings Covered | | | |
|---|---|---|---|---|---|---|---|
| Name of Assurer. | Name of Assured | Percentage on Sales beyond which Assure is given | Percentage on Rating which indebtedness mustnot ex. | Capital Rating | Credit Rating | Consideration. | Conditions |
| Name of Company. | | | | | | | |

WITNESSES:
Gustave Dieterich
H. b. s. Philip

INVENTOR
Levy Maybaum
BY
Briten, Atterbury, Hyde & Britten
ATTORNEYS

UNITED STATES PATENT OFFICE.

LEVY MAYBAUM, OF NEWARK, NEW JERSEY, ASSIGNOR TO THE UNITED STATES CREDIT SYSTEM COMPANY, OF SAME PLACE.

MEANS FOR SECURING AGAINST EXCESSIVE LOSSES BY BAD DEBTS.

SPECIFICATION forming part of Letters Patent No. 465,485, dated December 22, 1891.

Application filed January 5, 1891. Serial No. 376,808. (No model.)

*To all whom it may concern:*

Be it known that I, LEVY MAYBAUM, of the city of Newark, county of Essex, and State of New Jersey, have invented a certain new and useful Improvement in Means for Securing Merchants and others from Excessive Losses by Bad Debts; and I do hereby declare that the following is a full, clear, and exact description of the means and mode of making such guarantee and of practicing my said invention.

In the drawings hereto annexed, Figures 1 and 2 illustrate sheets, pages, or forms advantageously used in the practice of my invention.

By a careful observation of statistics and of other sources of information I have ascertained that the average losses due to bad debts vary in different lines of business, and I have compiled tables showing what the average percentage of losses in all of the principal lines or classes of business are and have been for a series of years. I have also ascertained that in those lines of business in which there is a large percentage of average loss there is also a larger percentage of average profit, and that therefore on the average persons transacting any given line or class of business can afford to make losses to the amount of the average percentage of their class without danger of too great a reduction of the profits of their business.

My invention or art and method of guaranteeing credits is based upon the ascertainment of these facts, and for the purpose of practicing my invention I have prepared or compiled tables in which all kinds of business are classified and the average rate or percentage of loss in each ascertained, from which can be readily determined what amount of loss in any given class of business would be a loss in excess of the average usually sustained from bad debts in that class, and what, therefore, would be an amount of loss which a person in that business cannot afford to make without impairing the average profits normally due in that class, and I have invented a sheet, page, or form for entering the details of such transaction, forms of which are shown in Figs. 1 and 2, respectively.

Heretofore it has of course been common for persons to obtain guarantees or security for individual doubtful debts due from certain customers or to require in the case of any given customer before dealing with him that purchases by that customer should be guaranteed. Such a course cannot, however, be generally adopted, as it would involve the obtaining of separate guarantees for each individual debt or each individual debtor. It is also not feasible to guarantee persons in business against any loss whatever from bad debts or to guarantee against all losses from any and all customers generally, as such a mode of practicing the business of guaranteeing would induce recklessness on the part of the person guaranteed in giving a credit.

My art, plan, method, or process of guaranteeing is intended to obviate the difficulties and trouble of procuring individual guarantees for individual debts or individual debtors, and also to provide a mode of carrying on the business of approximate general guaranteeing of business men's claims on such a basis that guarantees can be safely given on an established basis upon the payment of stated premiums without creating such a condition of indiscriminate security against all losses as would produce or induce a system of recklessness or indifference to the standing or credit of persons dealt with.

My method, as above stated, is based upon the compilation of the statistics as to average losses in different lines of business, and I believe that my art, plan, or system of guaranteeing payment by all persons of a given class on the payment of a fixed premium which will fairly represent the amount of risk to the guarantor and without privity on the part of the persons claims against whom are guaranteed is an entirely new art, method, or process.

I practice my invention as follows: When any person doing any special kind of business desires to be guaranteed against losses by bad debts, I first determine the percentage of loss in that business which is the average amount of loss from bad debts in that class, and in doing so I use, if previously compiled, tables in which different lines or classes of business are classified, and the averages or percentages of loss which can be sustained without inconvenience, as aforesaid, are stated. I then enter into a guarantee with the party applying to be guaranteed, based on the payment by him of a premium, determined by the risk of his class, securing him against any loss from bad debts in excess of the average loss of his class. I have discovered and ascertained, however, that it will not answer to guarantee against any and every loss by bad debts beyond or in excess of the average loss of the class, as such course would induce too great indifference to the standing of customers, but that some method or means must be adopted of designating the class, standing, or rating of the persons' liabilities from whom losses are to be guaranteed against. For this purpose, and in order to provide a means of ascertaining such standing or rating through instrumentalities not controlled by either of the contracting parties, I propose to adopt or specify that all of the persons payment from whom is to be guaranteed shall be persons of a given rating as to credit or capital, or both, in some established mercantile agency to be agreed upon. The rating of the parties whose solvency is thus guaranteed is intended to govern or affect the rate of premium to be charged.

I recommend, further, that the following course should also be adopted for additional security, viz: That in calculating the losses which are to be taken as constituting both the percentage of loss which is not to be paid because not in excess of the average of the class and also the excess over such average loss which is to be paid by the guarantor, those losses only are to be included which have been incurred from dealing with parties having high or good credit rating (A or B in usual mercantile-agency phrase) and to an amount not exceeding over a given percentage—say twenty per cent.—of this lowest reported capital. This restriction as to the character of the losses to be incurred and guaranteed against will tend to prevent the giving of excessive credit to single parties.

The restriction last above described, though recommended, I do not, however, prescribe in all cases as an essential feature of my method, as the amount of premium may be otherwise proportioned to the risk incurred.

As an example of the practice of my art, method, or process, I give the following illustration: X, who is engaged in the jeweler's trade, applies to me, or to a corporation organized for the purpose of practicing my invention, for a guarantee against bad debts. I ascertain from tables or statistics compiled as aforesaid the average losses in the jeweler's trade which have prevailed for a series of years, which I now specify, for illustration, at one per cent. I then agree with such applicant X on the payment of a certain premium (the amount of which is determined by the risk) that I or such corporation will, in consideration of such premium, make good to him all losses in his business due to bad debts incurred during a specified time—say one year—from selling to persons who, in some established agency (to be agreed upon) have a rating or capital of not less than, say, B rating as to credit and two thousand dollars rating as to capital, and whose indebtedness to the guaranteed party does not exceed twenty per cent. of the lowest amount of the agency-reported capital. The object attained in providing, as a condition, that the persons as to whom the guarantee is operative shall be of a given rating as to credit or capital, or both, is one of the means of restraining the party guaranteed from reckless or indiscriminate giving of credit, which might otherwise be induced by the assurance and security imparted by the use of my art or method, and the fact that it is not the full extent of all losses that is guaranteed against, but only the excess over the average losses of the particular business involved, is an additional means to the accomplishment of the same end, as the party guaranteed cannot tell in advance whether the possible loss from any given customer will fall within the average loss of his class, which he has to bear himself, or will cause an excess of such loss, which must be borne by the guarantor.

It will be readily understood from the above description of my art, method, or process that it is practiced by the use of peculiar books and tables and by the use of forms of contract or guarantee substantially of the kind and containing the provisions above indicated.

The peculiar construction of book used in the practice of my art, method, or process is as follows: I set apart a certain portion of the same to be used in connection with each guarantee that is made. I prefer to apply a page for such purpose, and I will proceed to describe a single page of a book of which all the pages are alike. Said page or book is more fully described in my divisional application for Letters Patent, Serial No. 404,582, filed September 5, 1891. At the top of the page I provide a form to be filled out with the distinguishing features of the particular guarantee to which the page is devoted. The drawing annexed hereto represents a page from said book, and I there indicate the form which I have found useful for this purpose. The remainder of the page I rule as shown in said drawing, indicating by appropriate words or signs the method of filling up the blanks. Columns are particularly provided for the details which will disclose whether or not any loss or what part thereof is covered by the guarantee, and from which it may be readily ascertained whether any or how much loss against which the person has been guaranteed has been sustained. When notice of any loss to a person guaranteed is received, the details of the same are entered on the page or portion of said book devoted to this particular guarantee.

Illustrations of the peculiar sheet, form, or page which embodies my invention are shown in Figs. 1 and 2, respectively. I provide separate spaces for entering the several details of the transaction hereinbefore described. For instance, there is a space for entering the name of the assurer, another for entering the name of the assured, another for entering the percentage or amount beyond which losses are guaranteed against, another for entering the percentage of the capital rating or the amount which the indebtedness of the party guaranteed against to the party guaranteed must not exceed, and another for entering the rating, capital, or otherwise, according to some established mercantile agency, which the party guaranteed against must have. The space for entering the name of the assurer or other of said details may be previously filled in, as shown in Fig. 2, and there also may be spaces for entering other conditions and the consideration of the transaction.

I believe that it is entirely new to eliminate by guarantee from the losses to which business men are subject all excess of loss over the average of any given class of business or to provide any means by which the general business of guaranteeing credits without consultation with individual debtors can be effected without promoting undue carelessness in business by limiting the guarantee to the excess over the average loss of the class and limiting it, also, to debts incurred by persons of an ascertained or ascertainable rating as to credit or capital.

What is described herein and not claimed I do not abandon; but I make a divisional application for Letters Patent for the same in the above-mentioned divisional application.

What I claim, and desire to secure by Letters Patent, is—

1. The means for securing merchants and others from excessive losses by bad debts, which consist of a sheet provided with separate spaces and suitable headings, substantially as described, for the name of the assurer, the name of the assured, the percentage or amount beyond which assurance is given, the class or classes of persons as to rating, capital, or otherwise, in respect to whom said losses are guaranteed against, and the percentage of said capital or the amount which said losses must not exceed.

2. The means for securing merchants and others from excessive losses by bad debts, which consist of a sheet bearing the name of the assurer and provided with separate spaces and suitable headings, substantially as described, for the name of the assured, the percentage or amount beyond which assurance is given, the class or classes of persons as to rating, capital, or otherwise, in respect to whom said losses are guaranteed against.

3. The means for securing merchants and others from excessive losses by bad debts, which consist of a sheet provided with separate spaces and suitable headings, substantially as described, for the name of the assured, the percentage or amount beyond which assurance is given, the class or classes of persons as to rating, capital, or otherwise, in respect to whom said losses are guaranteed against, in conjunction with a register for details of the transaction adapted to disclose the amount of loss sustained, substantially as described.

In testimony whereof I affix my signature, in presence of two witnesses, this 3d day of January, 1891.

LEVY MAYBAUM.

Witnesses:
L. SCHLESINGER,
H. V. R. PHILIP.